United States Patent
Deprun et al.

(10) Patent No.: US 8,392,588 B2
(45) Date of Patent: Mar. 5, 2013

(54) TERMINAL AND METHOD FOR SELECTING SECURE DEVICE

(75) Inventors: Jean-Francois Deprun, Paris (FR); David Dana, Nogent-sur-Marne (FR)

(73) Assignee: LG Electronics Inc., Seoul (KR)

( * ) Notice: Subject to any disclaimer, the term of this patent is extended or adjusted under 35 U.S.C. 154(b) by 269 days.

(21) Appl. No.: 12/361,735

(22) Filed: Jan. 29, 2009

(65) Prior Publication Data

US 2009/0254669 A1    Oct. 8, 2009

Related U.S. Application Data

(60) Provisional application No. 61/042,544, filed on Apr. 4, 2008.

(51) Int. Cl.
 *G06F 15/16* (2006.01)
 *H04W 4/00* (2009.01)

(52) U.S. Cl. .............. 709/229; 455/434; 455/435.1

(58) Field of Classification Search .......... 709/227–229; 455/434, 435.1
 See application file for complete search history.

(56) References Cited

U.S. PATENT DOCUMENTS

| | | | |
|---|---|---|---|
| 6,711,262 B1 | 3/2004 | Vatanen | |
| 6,976,171 B1 * | 12/2005 | Ritter et al. | 713/193 |
| 2002/0154632 A1 * | 10/2002 | Wang et al. | 370/389 |
| 2004/0260791 A1 | 12/2004 | Jerbi et al. | |
| 2005/0239504 A1 | 10/2005 | Ishii et al. | |
| 2006/0063565 A1 * | 3/2006 | Ueno | 455/558 |
| 2008/0212749 A1 * | 9/2008 | Huang | 379/88.25 |
| 2009/0215385 A1 * | 8/2009 | Waters et al. | 455/1 |

FOREIGN PATENT DOCUMENTS

WO    WO-01/35685 A1    5/2001

* cited by examiner

*Primary Examiner* — Jeong S Park

(74) *Attorney, Agent, or Firm* — Birch, Stewart, Kolasch & Birch, LLP

(57) ABSTRACT

A mobile terminal and method for selecting a secure device, are discussed. According to an embodiment, the method includes acquiring secure device selection information for each of at least one secure device associated with the mobile terminal; receiving a request for establishing a communication connection with a secure device from a server, the request including at least one of first information and second information, the first information associated with the server, the second information associated with the request or with a content included in the request; comparing the secure device selection information with at least one of the first and second information; and establishing a communication connection between the server and one of the at least one secure device based on the comparison result.

6 Claims, 3 Drawing Sheets

TERMINAL AND METHOD FOR SELECTING SECURE DEVICE

CROSS-REFERENCE TO RELATED APPLICATIONS

This application claims the benefit of priority of U.S. Provisional application Ser. No. 61/042,544 filed on Apr. 4, 2008, which is incorporated by reference in its entirety herein.

TECHNICAL FIELD

The present invention relates to a terminal and method for selecting an appropriate secure device associated with the terminal and establishing communication between the selected secure device and a server.

BACKGROUND ART

Technologies associated with mobile terminals are being rapidly developed and standardized, and such technologies offer better and more sophisticated services and products to various users. In this regard, a mobile terminal generally includes a secure element known as a SIM (Subscriber Identification Module) card. A secure element is also referred to herein as a secure device.

The SIM card is a removable storage device that can be provided in the terminal, and can store subscriber information which can be updated by a service provider (e.g., a server). Generally, a service provider issues a SIM card, which is then inserted into a mobile terminal, and then the service provider can update contents of the SIM card in the terminal using an OTA (Over-The-Air programming) operation.

Accordingly, the service provider can always communicate with its one corresponding secure device (SIM card) through the terminal. But, in the related art, the same service provider is not able to communicate with any other secure devices associated with the terminal even if that may be desired or needed (e.g., the corresponding secure device is full so the service provider needs to use another secure device). Further, a party (e.g., operator or application server) other than the service provider of the SIM card cannot establish communication with the SIM card. That is, the current configurations do not allow different servers to selectively establish communication with different secure devices associated with the terminal, as needed.

These limitations in the related art, unfortunately, prevent or restrict the current communication systems from providing more efficient operations and services with enhanced benefits and flexibility to various users and network entities. Further, the current systems do not allow the terminal to select a most suitable secure device among its multiple secure devices depending on the application or need.

SUMMARY

A technical goal of the present invention is to provide a terminal and method for determining a most suitable secure device with which a particular server may establish communication for a desired operation.

Another technical goal of the present invention is to provide a terminal and method for selecting a secure device, which address the limitations and disadvantages associated with the related art.

Another technical goal of the present invention is to provide a terminal having multiple removable storage devices, where the terminal can appropriately route a communication request from an external party to one of the removable storage devices.

According to an aspect of the present invention, there is provided a method for providing communication between a server and a secure device associated with a mobile terminal by using the mobile terminal, the method comprising: acquiring secure device selection information for each of at least one secure device associated with the mobile terminal; receiving a request for establishing a communication connection with a secure device from the server, the request including at least one of first information and second information, the first information associated with the server, the second information associated with the request or with a content included in the request; comparing the secure device selection information with at least one of the first and second information; and establishing a communication connection between the server and one of the at least one secure device based on the comparison result.

According to another aspect of the present invention, there is provided a mobile terminal for providing communication between a server and a secure device associated with the mobile terminal, the mobile terminal comprising: a transceiver configured to transmit or receive signals to or from another device; and a controller configured to control the transceiver, wherein the controller is further configured to: acquire secure device selection information for each of at least one secure device associated with the mobile terminal; receive a request for establishing a communication connection with a secure device from the server, the request including at least one of first information and second information, the first information associated with the server, the second information associated with the request or with a content included in the request; compare the secure device selection information with at least one of the first and second information; and establish a communication connection between the server and one of the at least one secure device based on the comparison result.

DESCRIPTION OF EXEMPLARY EMBODIMENTS

Hereinafter, preferred embodiments of the present invention will be described in detail with reference to the accompanying drawings. The following embodiments should be considered in descriptive sense only and not for purpose of limitation.

Figure 1:
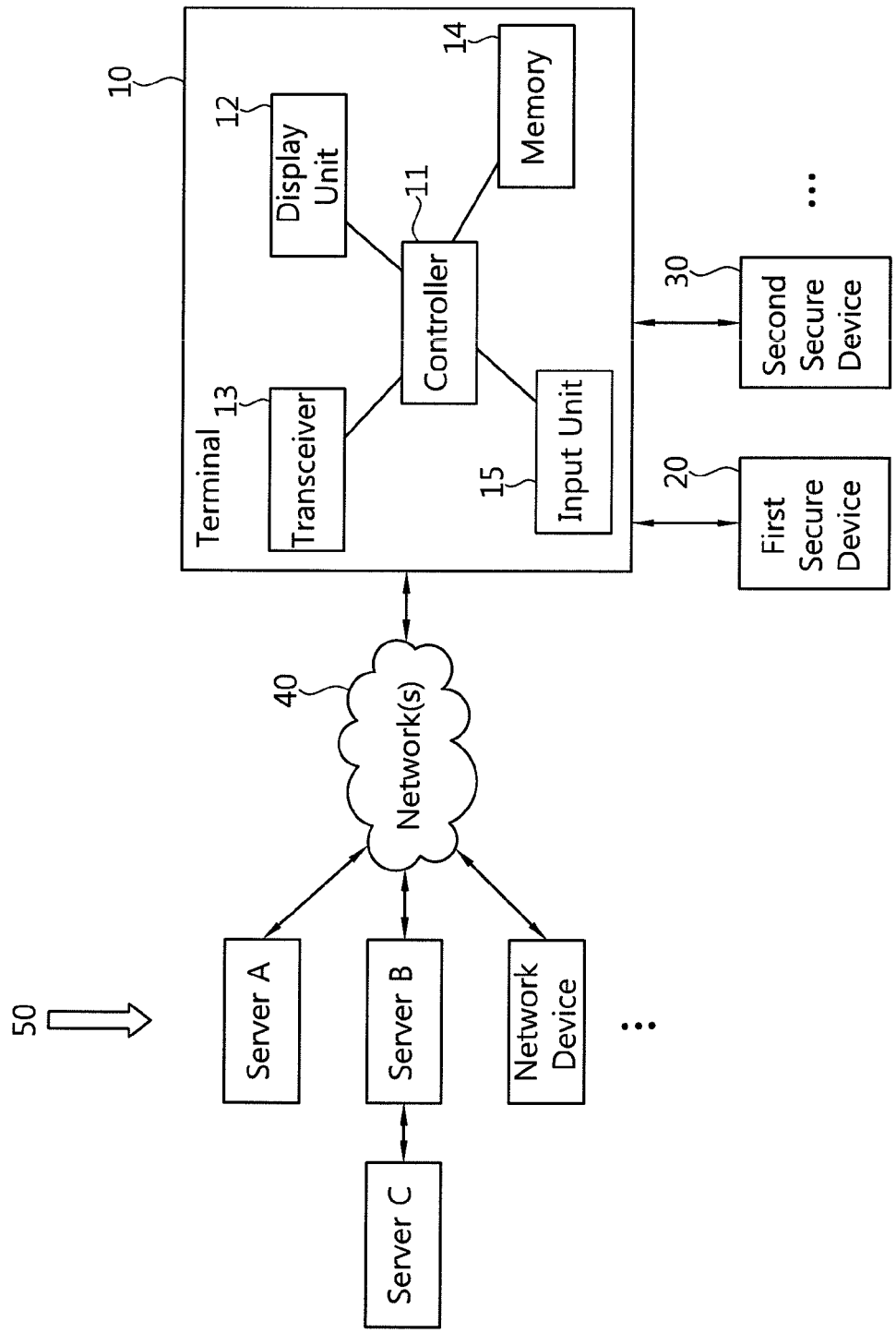
FIG. 1 is a block diagram of a mobile communication system according to an embodiment of the present invention.

FIG. 1 is a block diagram of a mobile communication system according to an embodiment of the present invention.

Referring to FIG. 1, the system includes a terminal 10, first and second secure devices 20, 30 associated with the terminal 10, and a plurality of servers A, B, C, . . . and other network devices 50 for selectively communicating with the terminal 10 through network(s) 40. Although two secure devices are shown, any number of secure devices may be present. The secure devices are also referred to herein as secure elements, which may be preferably storage devices.

The terminal 10 is configured to communicate with other terminals or network entities via the network 40. The network 40 can be, e.g., any mobile communication network such as a 2G or 3G network. The secure devices 20, 30 can be inserted into the terminal 10 or may be connected to the terminal 10 wirelessly or via wired connectors. All the components of the system are operatively coupled and configured.

Each of the secure devices 20, 30 can include a memory or storage unit for storing contents, and a controller such as a processor for controlling the respective memory. The contents stored in each of the secure devices can be any data or information, e.g., applications/programs such as secure applications, banking applications, transport applications, NFC applications, etc., files such as multimedia files, MP3 files, xHTML files, static files, dynamic files, etc., certified keys and other security data, subscriber information, terminal information, service provider information, video/audio data, etc. These are merely examples and the invention encompasses all types of contents.

If desired, each of the secure devices 20, 30 can also include any known encryption and decryption modules and/or authentication module for providing more secure data communication. For example, the secure devices can use known TLS (Transport Layer Security) protocols for providing secure data communication using public key infrastructure (PKI). According to an embodiment, any communication between the secure device and the server 50 may be securely provided using known secure data communication techniques.

The secure devices 20, 30 can be any device that includes a memory and a processor/controller. For example, each of the secure devices 20, 30 can be any type of smart card such as SIM, USIM, UICC, R-UIM, CSIM, etc., a SD (Secure Digital) card, a USB device, a MMC (MultiMediaCard) card, a GPS device, a Bluetooth device, etc.

The terminal 10 includes a controller or processor 11 such as a microprocessor or application processor, a display unit 12 (e.g., LCD panel) for displaying contents, a transceiver 13 for transmitting and receiving various signals, an internal memory 14, and an input unit 15 such as keypad, touch keys, etc. The terminal 10 can also include other known components such as a camera module, an audio output unit, additional memories, etc. All components of the terminal 10 are operatively coupled and configured.

The terminal 10 can be any device configured to communicate with the secure devices 20, 30 and with other entities such as servers and other terminals through the network 40 or other means. For example, the terminal 10 is preferably a mobile terminal such as a mobile phone, a smart phone device, a computer notebook, a handset, a user equipment, a mobile station, a pager, an MP3 player, a portable audio/video recording/reproducing device, a PDA, a GPS device, a Bluetooth device, etc.

The servers A, B, C and other network devices 50 can be any server or device that desires to communicate with at least one of the secure devices 20, 30 through the terminal 10. The servers 50 can be an application server (e.g., banking server), an operator server, any service provider's server, etc. For example, the server B may be an operator server which in turn communicates with other application servers such as the server C. Each of the servers 50 can include therein or communicate with one or more different applications/program modules/servers for respectively providing and managing different applications such as games, banking application, music, video, customization of terminal, etc. The network 40 can include a network server (e.g., SMS center) through which the servers 50 may need to go through to communicate with the terminal 10.

According to embodiments, each of the servers 50 can be identified using certain information and this information may be referred to herein as server information or sender information. For example, a unique IP address of the server may be used to identify the server. If an SMS (Short Message Service) request or some other request is to be sent from a particular server 50 (sender) to one of the secure devices 20, 30, then the server information identifying that server can be included in the SMS. For example, the server information can include at least one of a sender number (e.g., unique IP address of the sending server, a phone number of the server, etc.) and a service center number (e.g., IP address of operator server) of the SMS, for identifying a particular server. That is, each application server or operator server or any other server can have an identification number or identification information (e.g., combination of numbers or data) for uniquely identifying that server, which can be used as the server information. Depending on whether the sender of the request is an application server, operator server, etc., the sender number, service center number, or both numbers may be used as the server information. For instance, each operator (operator server) may have a unique service center number (e.g., for routing the SMS, etc.), which can be used to identify that operator server. Use of other types of sender/server information for identifying a server may also be used in the present invention.

In one embodiment, the terminal 10 can rely on the server information included in a communication request or other request from a server to determine which one of the secure devices should be selected to establish communication with the requesting server. In another embodiment, the terminal 10 may analyze information associated with the request or data in the request (e.g., text in the request message, etc.) to select an appropriate secure device. These methods will now be discussed in more detail.

Figure 2:
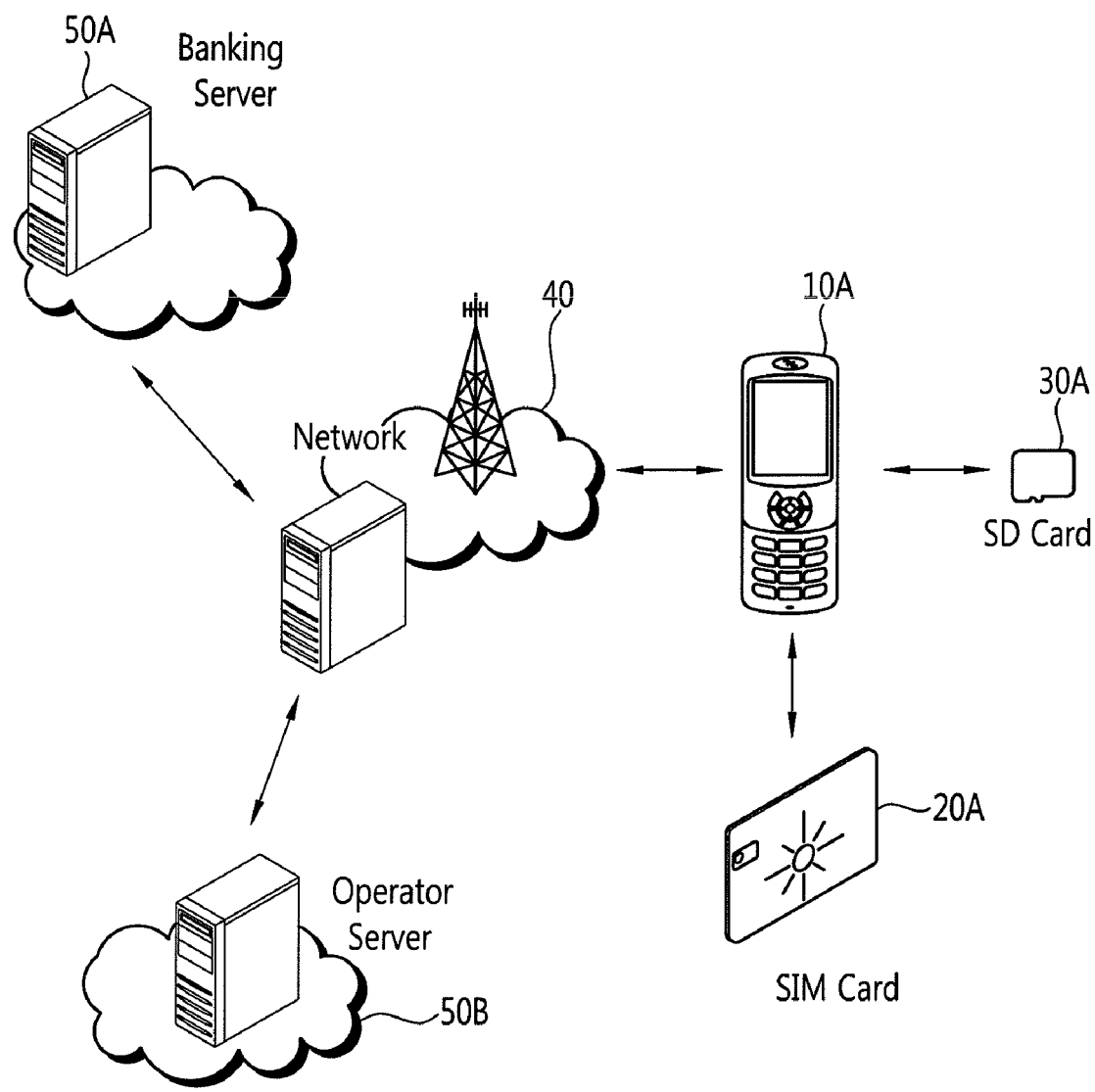
FIG. 2 is a diagram of a communication system for explaining an example of a scenario in which the present invention is applicable according to an embodiment of the present invention.

FIG. 2 is a diagram of a communication system for explaining an example of a scenario in which the present invention is applicable according to an embodiment of the present invention. The system of FIG. 2 is merely a non-limiting specific example of the system of FIG. 1 for easy understanding, and all methods discussed according to the invention are applicable to the system of FIG. 1 or 2 or other suitable systems.

In the example of FIG. 2, a terminal 10A includes secure devices such as a SIM card 20A and a SD card 30A. The terminal 10A can communicate with a banking server 50A or an operator server 50B through the network 40. The components 10A, 20A and 30A are examples of the components 10, 20 and 30, respectively, of FIG. 1. The servers 50A and 50B are examples of the servers A and B of FIG. 1, respectively.

When the SIM card 20A and SD card 30A are first connected to the terminal 10A or at certain designated time or event, each of the cards 20A and 30A notifies the terminal 10A (e.g., controller 11) about server information associated with the respective card. That is, each card has its own server information relevant to itself, and such server information is sent to the terminal from each card. For instance, if the SD card 30A has some relationship with both the banking server 50A and the operator server 50B (e.g., the SD card 30A has banking data and music data for providing banking and music services), then the SD card 30A may send the IP address of the banking server 50A as well as the service center number of the operator server 50B as the associated server information. In this example, the SIM card 20A on the other hand may provide server information that identifies a different server (not shown in FIG. 3). The respective server information can be prestored in each of the cards 20A and 30A, e.g., when the applications and data are loaded to the card before the connection with the terminal 10A.

Each of the cards 20A, 30A may also provide additional information to the terminal 10A, which the terminal 10A may use to select an appropriate card among the cards 20A, 30A.

If a particular server (e.g., the banking server 50A) desires to update banking data stored in the terminal 10A (e.g., in the SIM or SD card) through an OTA operation, then the banking server 50A may send a PUSH request including the sender number (e.g., phone number or other ID number of the banking server) to the terminal 10A. The terminal 10A then compares the server information received from the cards 20A and 20B with the sender number or information included in the PUSH request, and selects one of the cards 20A and 20B that is most suitable for this OTA operation based on the comparison result. For example, since the server information received from the SD card 30A includes the ID number of the banking server 50A which matches the sender number of the PUSH request, the terminal 10A may decide that the PUSH request should be directed to the SD card 30A. Accordingly, a communication channel between the banking server 50A and the SD card 30A is established via the OTA, and the banking server 50A appropriately can update the desired data in the SD card 30A.

Accordingly, the terminal 10A can select a most suitable secure device associated with the terminal 10A for any communication, OTA or other request from various servers.

Figure 3:
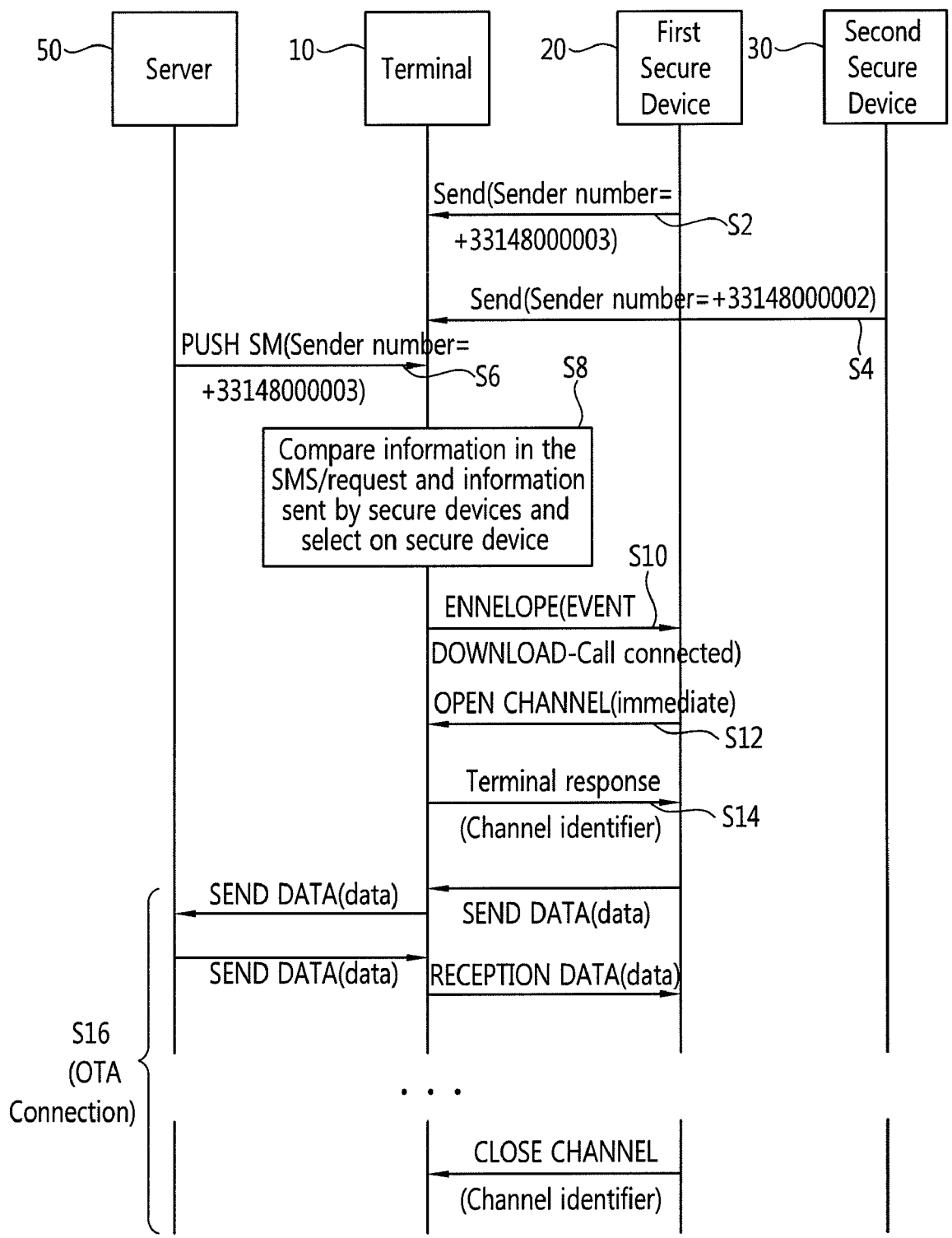
FIG. 3 is a flowchart illustrating a method for selecting a secure device according to an embodiment of the present invention.

FIG. 3 is a flowchart illustrating a method for selecting a secure device according to an embodiment of the present invention. The method of FIG. 3 can be implemented in the system of FIG. 1, but can be implemented in FIG. 2 or other suitable systems. Although only two secure devices and one server are shown, the system can have any number of secure devices that are associated with the terminal and any number of servers that are associated with the terminal and/or secure devices.

Referring to FIG. 3, at steps S2 and S4, each of the secure devices sends its own server information to the terminal 10 (e.g., terminal 10A). The server information from each secure device can include possible sender number(s), service provider number(s), other sender identification information, etc. associated with that secure device and/or the terminal 10. Each secure device preferably stores or can store therein multiple application server numbers (e.g., banking application, GPS, MP3 application, etc.) that are associated with the secure device, terminal, and/or subscriber. The sending of such server information from the first and second secure devices 20, 30 to the terminal 10 (e.g., to the controller 11) may occur at any designated time, e.g., when the secure devices 20, 30 are connected to the terminal 10, or when the secure devices 20, 30 are plugged into the terminal 10, or after the secure devices 20, 30 are reset, or when a certain set event occurs, etc. The server information received from each of the secure devices 20, 30 can be stored in the memory 14 of the terminal 10.

In the example of step S2, assuming that the first secure device 20 is associated with a server having an identification number of "+33148000003" (e.g., phone number), the first secure device 20 sends this server identification number to the terminal 10 as a possible sender number for the first secure device 20. Similarly, in the example of step S4, assuming that the second secure device 30 is associated with a server having the identification number of "+33148000002", then the second secure device 30 sends this identification number as the server information of the second secure device 30. Obviously, each of the first and second secure devices 20, 30 can be associated with multiple servers. In such case, all the corresponding identification numbers or information for identifying the associated multiple servers would be sent from each of the first and second secure devices 20, 30 to the terminal 10 as possible sender numbers and/or service center numbers, and would be saved in the memory 14 of the terminal 10 respectively as the server information associated with the first secure device 20 and the server information associated with the second secure device 30.

Steps S2 and S4 can occur using any known techniques or communication methods. For instance, the first and second secure devices 20, 30 can communicate with the terminal 10 via provisioning, e.g., factory provisioning, dynamic provisioning such as DM (Device Management) provisioning, etc. In other examples, the controller 11 of the terminal 10 may request and access the server information stored in each secure device.

At step S6, when a particular server 50 (e.g., server 50A) desires to update certain data stored in the terminal 10, the server 50 sends a request to the terminal 10 via the network 40, where the request includes the sender number, i.e., a number or data identifying the sender which in this case would be the server 50. For instance, if the server 50 desires to update data using an OTA operation via bearer independent protocol (BIP), then the server 50 sends a request to establish such communication with a secure device to the terminal 10 via the network 40. One example of such a request can be a PUSH SM message (a PUSH message used in a SMS context) as shown in FIG. 3. However, other types of PUSH methods can be used such as a SIP PUSH, a UDP PUSH, etc. Any PUSH SM message and other SMS messages from the server 50 may need to go through a network server such as a SMS center in the network 40 to be sent to the terminal 10.

All these PUSH methods are known where a PUSH message generally does not require a response to that message. The format of the PUSH message can also be found in a standardized document such as TS 102 226 by ETSI (European Telecommunication Standard Institute). The PUSH SM message may include a code indicating a request for BIP channel opening (OTA connection).

In the example of step S6, it is assumed that the server 50 has a unique identification number of "+33148000003", and thus the PUSH SM includes this identification number as the sender number since the server 50 is the sender of the PUSH SM. Conventionally, such a PUSH SM message does not include any sender number or service center number.

At step S8, the terminal 10 receives the PUSH SM message including the sender information such as at least one of the sender number and service center number, and compares this information with the server information (and any other information) that has been received from the first and second secure devices 20, 30 at previous steps S2 and S4. Based on the comparison results, the terminal 10 then selects one of the secure devices 20, 30 and initiates the requested communication between the selected secure device and the requesting server 50.

For example, the terminal 10 in this example may search all the server information received from the secure devices for the sender number of "+33148000003" included in the received PUSH SM. This search would indicate that the first secure device 20 has the same sender number associated with it, and thus the terminal 10 may select the first secure device 20, among all the associated secure devices, as the most suitable secure device to communicate with the server 50.

Once the terminal 10 selects a suitable secure device in step S8 (in this example, the first secure device 20), then the terminal 10 begins the process of initiating an OTA connection or any other requested communication between the server 50 and the selected secure device 20. The process of initiating the OTA connection and updating contents of a secure device using the OTA connection are well known and thus will be briefly discussed referring to steps S10-S16. Protocols for the OTA connection can also be found in standardized documents.

At step S10, the terminal 10 sends an ENVELOPE (EVENT DOWNLOAD—Call connected) message to the selected secure device 20 to inform the selected secure device 20 about the OTA connection request from the server 50. The format of the ENVELOPE (EVENT DOWNLOAD—Call connected) message can also be found in a standardized document such as TS 122 223 by ETSI. Information needed by the selected secure device 20 to launch the OTA connection using an OPEN CHANNEL message is included in this ENVELOPE message.

At step S12, the selected secure device 20 uses the information included in the received ENVELOPE message or interprets this information, and launches an OTA by sending an OPEN CHANNL (Immediate) message to the terminal 10. The format of the OPEN CHANNEL message can also be found in a standardized document such as TS 102 223 by ETSI.

At step S14, the terminal 10 sends a Terminal Response (Channel identifier) message to the selected secure device 20 to open the channel.

Thereafter, at step S16, the OTA connection (communication channel) is established between the server 50 and the selected secure device 20 through the terminal 10, and a desired action can be performed through the OTA connection. For instance, data can be exchanged, the server 50 can send update data or new data to the selected secure device 20, the server 50 may request an action or data from the selected secure device 20, etc. In another example, the server 50 may update the server information stored in the selected secure device 20 in which case, subsequently, the selected secure device 20 may perform an OTA with another server based on the updated server information.

After the desired action(s) in or by the selected secure device 20 are completed through the OTA connection, the selected secure device 20 may send a CLOSE CHANNEL (Channel identifier) message to the terminal 10 to close the OTA connection.

Although in FIG. 3 the OTA connection is used, the present invention is not limited thereto and other connections can be used to establish a communication channel between a server and a selected secure device after a terminal selects a most suitable secure device as discussed above. For instance, a WAP connection using an APN may be used in which case a request from a server 50 may not need to go through a SMS center.

According to another embodiment, instead of an OTA connection, a SIP (Session Initiation Protocol) session may be used, which is well known. In that case, each of the secure devices 20, 30 associated with the terminal 10 may send SIP URL information associated with its possible servers, as server information. Then, for instance, if a particular server 50 requests a SIP session for updating contents, then the terminal 10 may analyze the stored SIP URL information with the SIP URL provided in the SIP session request, and select a most suitable secure device based on the analysis results. Then the terminal 10 may send an INVITE message to the server 50 for requesting update data, and in return, the server 50 can send a response message such as a 200 OK message including the update data to the terminal 10. The terminal 10 then communicates with the selected secure device to update the selected secure device using the update data. As a variation, once the terminal 10 selects the suitable secure device, the server 50 may send an INVITE message including update data to the terminal 10, and in return, the terminal 10 may send a response messages such as a 200 OK message to the server 50. Then the terminal 10 may update the selected secure device using the received update data. SIP protocols are commonly used and such various SIP-based messages for establishing a SIP session are well known.

According to still another embodiment, in lieu of or in addition to using the server information to select an appropriate secure device, the terminal 10 may use other information to make this selection. For instance, information associated with the request (e.g., PUSH SM) and/or with a content included in the request may be used. As an example of such information, data in the core of the PUSH SM message may be used, which may include, e.g., device identifies, Alpha identifier, icon identifier, bearer description, network access name, other address (local address), text string (e.g., user login), text string (e.g., user password), UICC/terminal interface transport level, data destination address, text attribute, frame identifier, etc. In another example, the actual text in the SMS or PUSH SM message may be analyzed. For instance, by looking for the presence of certain words in the text, the terminal 10 may make the appropriate secure device selection. For instance, if the word 'banking' or 'deposit' appears in the text of the SM message, then the terminal 10 may select the first secure device 20 over the other secure device(s) (assuming that the first secure device 20 includes a banking application or banking related data). By analyzing and comparing various information associated with the request itself, the terminal 10 can select a most suitable secure device to which the request may be applied. The terminal 10 may have a correspondence table which indicates characteristics and properties that are associated with each secure device, and may search such characteristics and properties in comparison with the information received in the request or information associated with the request from a server to determine which secure device would be most suitable, e.g., has characteristics and properties that most match the information received from the server. The correspondence table or the like (e.g., secure device-to-server correspondence/preference database) may be compiled by the terminal 10, e.g., using information obtained from the secure devices. If needed, the terminal 10 may request specific information from the secure devices.

According to another embodiment, the terminal 10 itself may include its own secure device in addition to externally provided secure devices such as SIM card, SD card, etc. For instance, the internal memory 14 (or another memory) of the terminal 10 in conjunction with the controller 11 (or another controller/processor) of the terminal 10 may constitute and be configured to perform functions of the secure device 20, 30, . . . . In such cases, when a request to establish communication with a secure device is received from a server 50, the terminal 10 can check the server information received from the secure devices 20, 30 and server information of the memory 14 (or terminal itself), and perform the comparison step, or can analyze the information in (or associated with) the request with the secure device-to-server correspondence/preference database (which would include the internal memory 14 as one of the secure devices) to select a suitable secure device.

According to embodiments, in each of the secure devices, various contents may be stored, updated, and/or executed by appropriate server(s) using the methods discussed above. Examples of contents that can be stored in the secure devices can be types of applications (e.g., NFC (Near Field communication) applications, RSA or other cryptography applications, data/communication protection applications, banking applications, memory applications, backup applications, video applications, music applications, streaming applications, etc.), one or more such applications or related data, manufacturer and version of the applications, capabilities of the applications, etc., information about services associated with the secure device such as subscriber information, service provider information, service information, etc. Such information may be selectively provided from each secure device to the terminal 10 so that the terminal 10 can have sufficient information to make an appropriate selection of a secure device. If needed, the terminal 10 may request each secure device to provide specific information so that the terminal 10 may rely on such information to make the secure device selection.

As discussed above, the present invention is applicable when a server desires to update contents in a secure device. In the same or similar manner, the present invention is equally applicable in other situations where a server desires an action by or in a secure device, e.g., displaying a pop-up message on a screen of the terminal by the secure device, launching an application in the secure device, etc. The terminal can analyze at least one of the server information, information associated with a request for a specific action, information in the request, and other information as needed, to select a most suitable secure device to which the request for the specific action may be applied.

In still another example, the present invention can be applied to provide additional application features (e.g., NFC application) in an effective manner. For instance, to a terminal, a SIM card (as a first secure device) can be provided to include a transport application with fees and authorization information, and a second secure device such as a SD card can be additionally provided. The second secure device can include one or more of any applications such as NFC applications, banking applications, MP3 applications, shopping applications, telecom applications, etc. And depending on a specific action being requested by a server, the terminal can direct such request to an appropriate secure device among the multiple secure devices associate with the terminal. As a result, the most suitable secure device is selected, among the multiple secure devices, to establish communication with the server, whereby effective and efficient communication services may be provided.

When a particular server desires to perform a certain operation, the invention allows a terminal to select a secure device among multiple secure devices associated with the terminal, which would be most suitable for the operation.

While the present invention has been particularly shown and described with reference to exemplary embodiments thereof, it will be understood by those skilled in the art that various changes in form and details may be made therein without departing from the spirit and scope of the present invention as defined by the appended claims.

The present invention may be applicable to a terminal having at least one secure device associated with it.

What is claimed is:

1. A method for performing communication in a wireless communication system, the method performed in a mobile terminal and comprising:
   acquiring secure device selection information for each of at least one secure device associated with the mobile terminal from a correspondence table, wherein the secure device selection information indicates at least one characteristic of the at least one secure device;
   receiving a push short message to initiate an Over-The-Air (OTA) connection with a serve, the push short message including a sender number and a text string which indicates at least one characteristic of a secure device with which the push short message is associated;
   selecting one of the at least one secure device, without using the sender number, by comparing at least one characteristic indicated by the secure device selection information with the at least one characteristic indicated by the text string;
   preparing an initialization of the OTA connection by transmitting an envelope message to the selected secure device and receiving an open channel message from the selected secure device;
   transmitting a terminal response message including a channel identifier indicating a communication channel used for the OTA connection to the selected secure device; and
   performing a communication based on the OTA connection between the server and the selected secure device.

2. The method of claim 1, wherein the at least one secure device associated with the mobile terminal includes a first secure device and a second secure device which are equipped in the mobile terminal, and the first secure device and the second secure device are associated with a first server and a second sever, respectively.

3. The method of claim 1, wherein the at least one secure device includes a SIM card and a SD card.

4. A mobile terminal for communication in a wireless communication system, the mobile terminal comprising:
   a transceiver configured to transmit or receive signals to or from another device; and
   a controller configured to control the transceiver, wherein the controller is further configured to:
   acquire secure device selection information for each of at least one secure device associated with the mobile terminal from a correspondence table, wherein the secure device selection information indicates at least one characteristic of the at least one secure device;
   receive a push short message to initiate an Over-The-Air (OTA) connection with a server, the push short message including a sender number and a text string which indicates at least one characteristic of a secure device with which the push short message is associated;
   select one of the at least one secure device, without the sender number, by comparing at least one characteristic indicated by the secure device selection information with the at least one characteristic indicated by the text string;
   prepare an initialization of the OTA connection by transmitting an envelope message to the selected secure device and receiving an open channel message from the selected secure device;
   transmit a terminal response message including a channel identifier indicating a communication channel used for the OTA connection to the selected secure device; and
   perform a communication based on the OTA connection between the server and the selected secure device.

5. The mobile terminal of claim 4, wherein the at least one secure device associated with the mobile terminal includes a first secure device and a second secure device which are equipped in the mobile terminal, and the first secure device and second secure device are associated with a first server and a second sever, respectively.

6. The mobile terminal of claim 4, wherein the at least one secure device includes a SIM card and a SD card.

* * * * *